United States Patent
Dunou

[15] 3,702,927
[45] Nov. 14, 1972

[54] PULSE RATE DEVICE TO COMPUTE SQUARE ROOT OF PRODUCTS

[72] Inventor: Pierre André Dunou, Bagneux, France

[73] Assignee: Compagnie des Compteurs, Montrouge, France

[22] Filed: Sept. 21, 1970

[21] Appl. No.: 73,855

[30] Foreign Application Priority Data

Oct. 2, 1969 France..................6933636

[52] U.S. Cl.................................235/158
[51] Int. Cl.................................G06f 7/48
[58] Field of Search............235/158, 150.3; 328/158

[56] References Cited

UNITED STATES PATENTS

| | | |
|---|---|---|
| 3,126,476 | 3/1964 | Pariser et al............235/150.3 |
| 3,278,730 | 10/1966 | Searcy et al..............235/158 |
| 3,474,236 | 10/1969 | Batte.....................235/150.3 |
| 3,557,348 | 1/1971 | Aemmer................235/158 X |

Primary Examiner—Malcolm A. Morrison
Assistant Examiner—David H. Malzahn
Attorney—Pierce, Scheffler & Parker

[57] ABSTRACT

Computation of square root of a product of two magnitudes by the steps of converting each of said magnitudes into series of impulses, each having a frequency proportional to the amplitude of said two magnitudes, recording said series of impulses in registers, multiplying the respectively recorded series of impulses to obtain, their product dividing said product by a fixed number in a divider and using the signal issued from said divider to reset one of said registers.

11 Claims, 6 Drawing Figures

3,702,927

PULSE RATE DEVICE TO COMPUTE SQUARE ROOT OF PRODUCTS

This invention concerns a process to obtain a signal having a frequency proportional to the geometrical mean value of two magnitudes, i.e., the square root of their product, and also a device for embodying this process.

When utilizing the informations given by measuring devices, it is sometimes necessary to obtain the square root of the product of some measured magnitudes, as for example the measure of the mass flow of a fluid through a pipe. Using $\rho$ as a representation of the volume mass of the fluid and $\Delta P$ as the differential pressure given by a drop in pressure of the fluid in the pipe, it is known that the mass flow is proportional to the expression $\sqrt{\rho \cdot \Delta P}$. The utilization of such a component with a measuring device of the volume mass enables metering of the quantity of fluid flowing through the pipe, with the condition that the representative magnitude of $\sqrt{\rho \cdot \Delta P}$ be itself in the form of a totalizable magnitude.

Consequently, it is particularly desirable that this magnitude be obtained in the form of impulses to allow its totalization by a simple counting procedure.

Devices have already been proposed for extracting the square root of a product with circuits equipped with operational amplifiers but these devices, since they are operating in an analogical way and since on the other hand, they have only a low accuracy, do not solve properly the problem which is met in the present invention.

The invention concerns a process to obtain a signal of which the frequency is representative of the square root of the product of two magnitudes, in which these two magnitudes are previously converted into two series of impulses, of which frequencies are proportional to the amplitudes.

The two magnitudes, for instance the volume mass and a differential pressure of a fluid, generally being available in the form of voltage or electric current, many devices are known to convert these electrical signals into the form of proportional frequencies.

The invention has also for its object the provision of a device allowing for the calculation of the square root of a product by entirely numerical means, in order not to introduce errors other than those resulting from preceding voltage-to-frequency or current-to-frequency converters.

The improved process for computing the square root of the product of two magnitudes comprises the steps of continuously converting each magnitude into a series of pulses having a frequency proportional to the magnitude, continuously recording each series of pulses in a corresponding memory register such as a binary pulse counter, continuously multiplying the respective outputs of the registers to obtain a resulting signal having a multiplied frequency, dividing the multiplied frequency by a fixed number thus to obtain successive data having a frequency equal to the quotient and which is proportional to the square root of the product and applying each data to reset one of the memory registers to zero.

For embodying this process, the invention provides a device comprising a first and a second register in which the two above series of impulses are respectively transmitted, a multiplier having inputs thereof connected to said registers to the product of their contents and an impulse divider having a fixed divisor connected to the multiplier output, the output signal of said frequency divider being utilized to return to zero at least one of said registers.

The multiplier, which performs in a quasi-continuous way the product of data contained in two registers, on which are applied the two series of impulses, can be made in different ways.

In a first embodiment, based on a comparison, flip-flop per flip-flop of the two registers, the multiplier is composed of a unit of logical circuits detecting the state of flip-flops respectively associated with said registers. In another embodiment, based on successive additions, the multiplier includes an adding component which adds to the content of the first register the content of the second register upon each impulse received by the second register.

Other characteristics of the invention will become apparent from the following description, in connection with the accompanying drawings, given as a nonlimitative example. On said drawings.

Figure 1:
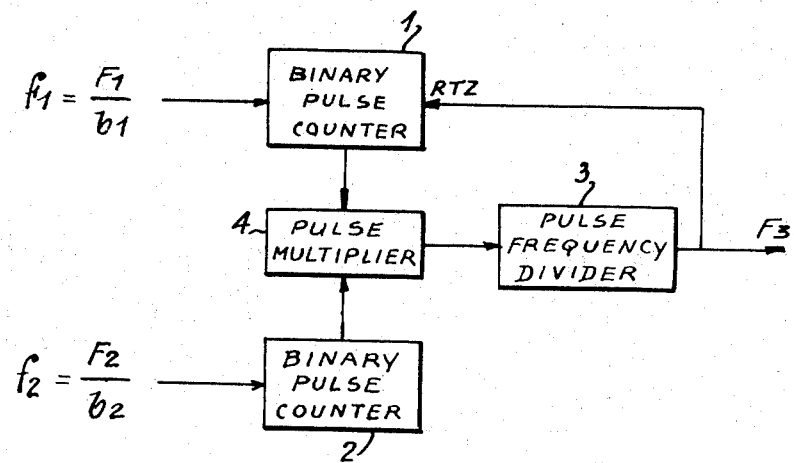
FIG. 1 is a block circuit diagram of the device according to the invention.

On FIG. 1, two registers have been shown for example two counters of binary impulses 1 and 2 of identical capacity, at the input of which are applied impulses having recurrence frequency $f_1$ and $f_2$ equal or sub-multiples of signal frequencies $F_1$ and $F_2$ representing two terms of a product from which it is desired to extract the square root.

An impulse multiplier circuit or pulse multiplier 4 has its inputs connected to each of the two counters or registers 1 and 2 to perform the product of their registered and its output is connected to an impulse divider or pulse frequency divider 3, for instance to another counter of capacity R which may be of the ring type, i.e., which emits an impulse at the end of each cycle of counting.

The output impulses of this divider when it has reached its capacity, constitute a signal of a frequency $F_3$ which, as hereafter explained, is proportional to the desired square root, and these impulses are also utilized in conformity with the process of the invention, to return to zero or reset through the connection RTZ (Return to zero) one of the two registers, for instance the register designated by 1.

Let it be assumed, for example, that $f_1 = F_1/b_1$ and $f_2 = F_2/b_2$ where $b_1$ and $b_2$ are whole numbers, higher or equal to 1 which are present only because of the counter dimension but not of the operating principle. During a period of time T, in seconds, each counter 1 and 2 respectively receives $f_1T$ and $f_2T$ impulses, so that, at the multiplier output 4, the product of $f_1 f_2 T^2$ or a submultiple $f_1 f_2 T^2/a$ of this product, appears during the same time. After the division by R in divider 3 at the output of this circuit, it appears always in the same time T, impulses of mean average frequency $F_3$, such as:

$$F_3 = \frac{f_1 f_2}{aR} T^2 \frac{1}{T} = \frac{f_1 f_2}{aR} T$$

Since these output impulses must be utilized to return to zero the counter 1, the $F_3$ frequency must be connected to the time by the relation $T = 1/F_3$. While eliminating the time $T$ in the relation obtained above, it becomes:

$$F_3^2 = \frac{f_1 f_2}{aR} \text{ or } F_3 = \sqrt{\frac{f_1 f_2}{aR}} = \sqrt{\frac{F_1 F_2}{ab_1 b_2 R}}$$

It is noticed that the output impulse frequency of circuit 3 is well proportional to the square root of the frequence product $F_1 \cdot F_2$ of the two input signals.

The multiplier 4 continuously perform the product of the respective outputs from counters 1 and 2 supplied with the input pulse frequencies $f_1$ and $f_2$. Said multiplier can be made in several ways. By way of example, two realizations will be shown for which the counters 1 and 2 are composed of binary counters of $a/2 = 2^{N-1}$ capacity. Besides, an input circuit is provided, said input circuit giving the separation — in the time — of impulses at frequencies $f_1$ and $f_2$ and being preferably of the type described in the French Pat. No. 2,064,528 filed on Sept. 22, 1969, by Compagnie des Compteurs, for "Circuit for impulses separation and synchronization." In said prior patent, the circuit for separating and synchronizing impulses coming from several circuits comprises a set of temporary recorders respectively receiving the impulses issued from one of said circuits and said recorders are operated to be read by means of a clock associated with a synchronizer whereby a first signal coming from the clock operates a first recorder which thus is read, a second signal operates a second recorder, etc. This synchronizer circuit is essentially intended to avoid the application of frequency impulses $F_1$ and $F_2$ simultaneously on the two counters 1 and 2.

Figure 2:
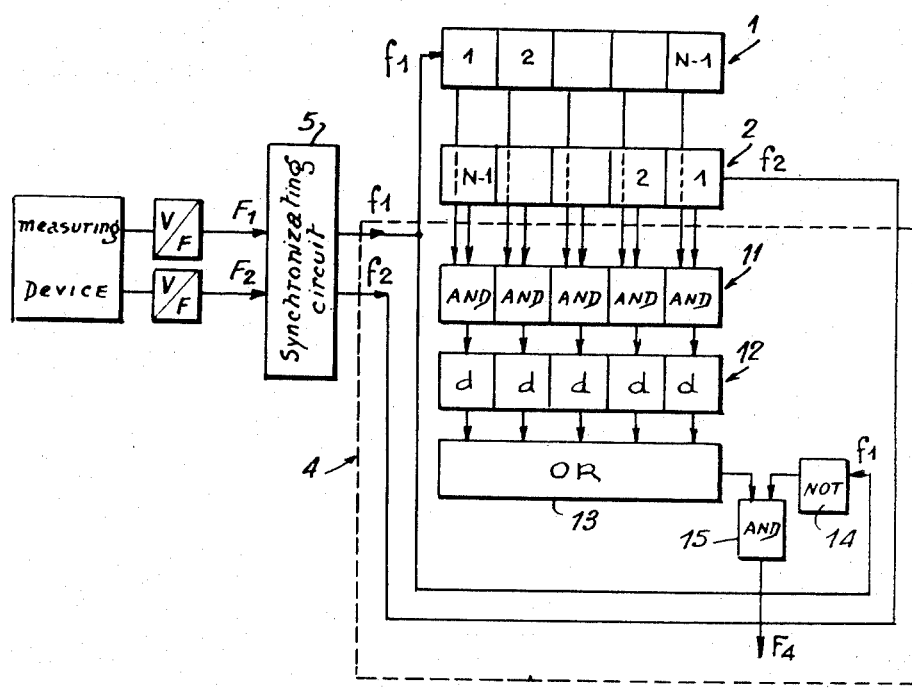
FIGS. 2 and 4 are two different ways for realizing the multiplier circuit of FIG. 1.

In accordance with the circuit depicted in FIG. 2, the input impulses $F_1$, $F_2$ which are representative, respectively of two different magnitudes produced by a measuring device and, for instance, produced by voltage to frequency transformers, are applied on a circuit 5 of the type described in the above-mentioned patent and which utilizes a clock impulse generator of which the frequency is determined, for instance: equal to $F_2 = 4 f_2$. Then a divider by four is utilized, e.g., a set of flip-flops, inserted at the circuit output, on way $F_2$. This circuit 5 elaborates impulses $f_1$ at a rate slightly irregular and of mean average frequency $f_1 = F_1$, as indicated FIG. 3; in other words, coefficients $b_1$ and $b_2$ have for value 1 and 4 respectively.

The multiplier 4 of FIG. 2 includes a set (N−1) of AND circuits 11, followed by differentiation circuits 12 having their outputs connected to a OR circuit 13. The differentiation circuits 12 are provided to detect the instant at which the AND circuits 11 undergo a change of state and may, for example, be made by means of well known monostable circuits. The two inputs of each AND circuit 11 are respectively connected to the stages of complementary rows of the counters 1 and 2, i.e., of which the sum of weights has then the value N (N−1 = 5 on FIG. 2). The impulses at frequency $f_1$ are also applied on a NOT circuit 14. The outlets of the OR and NOT circuits 13 and respectively 14 are connected to inputs of a AND circuit 15 which generates the output impulses of the multiplier at the mean average frequency $F_4$.

Figure 3:
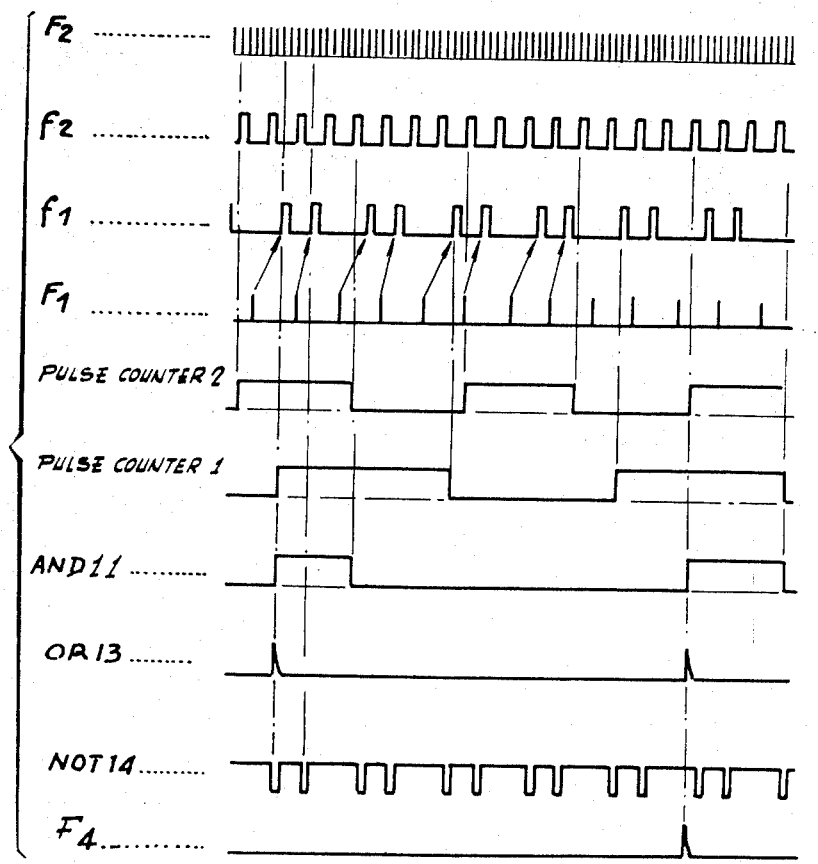
FIG. 3 is a diagram explaining the operation of the multiplier of FIG. 2.

The diagram, as a function of the time indicated in FIG. 3, explains the operation of the impulse phase shifting circuit or synchronizer 5 of the above-mentioned patent and also the operation of the multiplier 4 for which, as an example, is shown the state of the flip-flop of row 3 of the counters 1 and 2, said flip-flops being of complementary row since N = 6 and the resulting output signals from logical circuits 11 to 15.

Thus, to each impulse $f_1$, any output impulse from OR circuit 13 is cancelled because of the NOT and AND circuits 14 and respectively 15. Now, at each impulse $f_2$ takes place the shift from 0 to 1 of one flip-flop of counter 2. This one gives, through AND circuit 11, which is connected to it, an impulse at the output of multiplier 4 if the corresponding flip-flop of counter 1 is itself at state 1.

The content of counter 1, assumed as being equal to zero at the time $t = 0$, is, after a time $t$ equal to $f_1 t$; the mean average frequency $F_4$ of the impulses at the output of multiplier 4, is consequently equal to the filling rate of counter 1 (that is the relation of its contents $f_1 t$ with its capacity $a/2$), multiplied by the frequency $f_2$, that is:

$$F_4 = (2/a) f_1 f_2 t$$

As a matter of fact, the content of counter 1 can be written as: N_N⁻
$a_1 \cdot 2^0 + a_2 \cdot 2^1 + ... + a_{N-1} \cdot 2^{N-2}$
expression in which the coefficients $a_1, a_2, ... a_{N-1}$ have the value 0 or 1 depending on the state of the corresponding weight flip-flop $2^0, 2^1 ... 2^{N-2}$.

The number of impulses at frequency $F_4$ produced at the output of the multiplier 4 during the time period $t$ is, on the one hand, a function of frequency $f_2$, and on the other hand, also a function of the state of the flip-flops of counter 1 respectively connected to the flip-flops of the complementary row in the counter 2 which performs in accordance with the impulses of frequency $f_2$ the successive division by $2, 2^2 ...... 2^{N-1}$, that is:

$$F_4 = f_2 \frac{1}{2} a_{N-1}$$
$$+ f_2 \frac{1}{2} 2 a_{N-2}$$
$$+ .......$$
$$+ f_2 \frac{1}{2^{N-1}} a_1$$

which can be written:

$$F_4 = \frac{f_2}{2^{N-1}} (a_1 2^0 + a_2 2^1 + \ldots + a_{N-1} 2^{N-2})$$

The term in parentheses show the expression of the content of counter 1, that is $f_1 t$; consequently it can be seen that effectively, there is:

$$F_4 = \frac{f_2}{2^{N-1}} f_1 t = \frac{2}{a} f_1 f_2 t$$

Since it has been put down: $a/2 = 2^{N-1}$.

The return to zero of the counter 1 by divider 3 is made after a period of time $T$ such as:

$$\int_0^T \frac{2}{a} f_1 \cdot f_2 \cdot t \cdot dt = R$$

with $1/T = F_3$ frequency of output signals of from the divider. Then:

$$\frac{f_1 \cdot f_2 \cdot T^2}{a} = R \text{ and } \frac{1}{T} = F_3 = \sqrt{\frac{f_1 \cdot f_2}{aR}} = \sqrt{\frac{F_1 \cdot F_2}{4aR}}$$

This assumes that counter 1 is not overloaded before the counter 3, that is : $a/2 > f_1 \cdot T$, that is eliminating $T$, $f_1/f_2 \cdot a A a/4R$. Consequently, the respective capacities $a$ and $R$ will be selected so that this disparity be checked.

Figure 4:
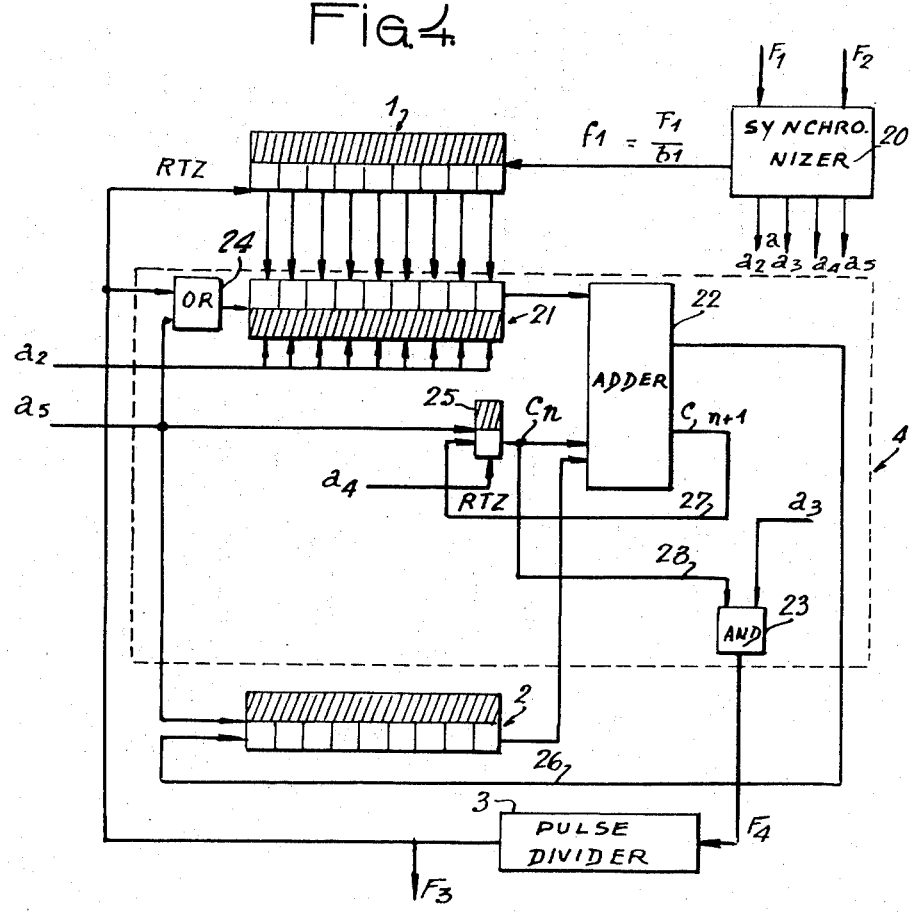

Another embodiment of the multiplier is shown in FIG. 4. According to this embodiment, the multiplier 4 adds the contents of counter 1 to the contents of counter 2 for each impulse of frequency $f_2$ received and it gives a impulse of frequency $F_4$ for each overload of counter 2.

The multiplier 4 includes a register or counter 21 of same capacity as counter 1, for instance $2^9$, and of which the stages are respectively connected to the homologous stages of this counter. The output of the counter 21, on the side of the flip-flops of lower weights, is connected to one of the inputs of an adding component or adder 22 having its second input connected to the output of counter 2, on the side of the lower weights of this counter. The output of the adding component 22 is connected to the input of counter 2 by a connection 26.

Reference numeral 25 shows a carrying over flip-flop of the adding component 22. This flip-flop is composed of a double flip-flop of the "MASTER-SLAVE" type and gives an output information which is identical to the one which is applied to its information input after receiving an impulse applied to its reading input, like a shifting register component.

The flip-flop 25 has its output $C_n$ connected to the third input of the adding component 22 and $C_n + 1$ designates the output of the adding component on which is shown the new carrying over which is put temporarily in memory in the flip-flop 25 by a connection 27 to appear upon the adding of the binary figures having an immediately higher row. This flip-flop, in particular, is used to show the last carrying over of the addition showing the possible overload of register 2.

Figure 6:
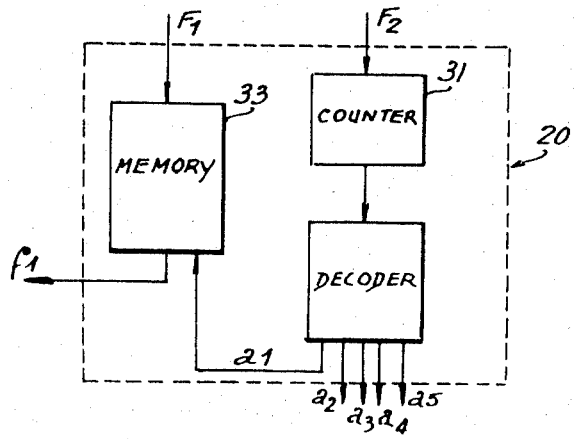
FIG. 6 is a diagram of the synchronizer circuit of FIG. 4.

A synchronizer circuit 20 which will be described with more details in connection with FIG. 6 gives the piloting impulses to the multiplier 4, from a cyclic operation rhythmed by the $F_2$ impulses.

Figure 5:
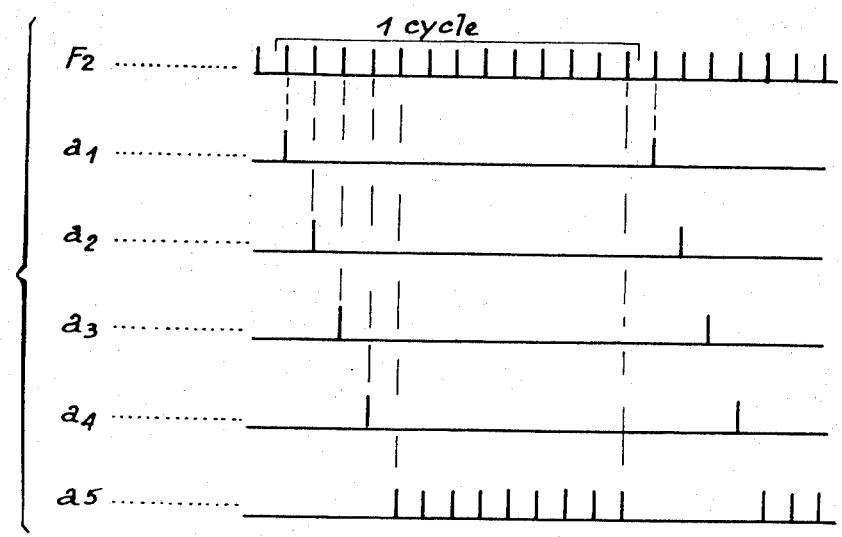
FIG. 5 is a diagram concerning the piloting impulses of multiplier of FIG. 4.

These piloting impulses $a_1$ to $a_5$ are distributed on five ways as shown in FIG. 5 where the time is given as abscissa. In the example shown the preceding coefficients $b_1$ and $b_2$ have been selected, such as :

$b_1=1$    $f_1 = F_1$
or                         assuming $f_1 < f_2$
$b_2=13$    $f_2 = F_2/13$ Out of 13 successive impulses defining a cycle of operation, four impulses $a_1$ to $a_4$, consequently phase shifted from each to other of $F_2/13$ are utilized as piloting auxiliary impulses to ensure the operation of the multiplier and the nine other ones as shift signals for the nine steps of the input recorders 2 and 21 of the adding component.

The impulse $a_1$ acts as reading impulse for the impulse $F_1$ eventually put in memory in synchronizer 20 during a cycle.

The impulse $a_2$ causes the transfer, without any obliteration, of the content of counter 1 into the register or counter 21, before an adding operation.

The impulse $a_3$ is applied to an input of a AND circuit 23 having a second input connected to the output of the flip-flop 25 by a connection 28, and the output of the AND circuit 23 is connected to the divider 3.

The impulse $a_4$ is applied to the control for returning to zero the carrying over flip-flop 25 of the adding component before a new adding operation.

Finally, the nine impulses $a_5$ are submitted in parallel, on one hand to the input of registers 2 and 21 through a OR circuit 24, to make them shift, step by step and so, make the addition of their contents, flip-flop per flip-flop and, on the other hand, at the input of the flip-flop 25 to cause the transfer of its content into the adding component 22 upon each elementary cycle of addition.

The output of the divider 3, consisting of a counter with a capacity R, is connected to the RTZ control of the counter 1 and to the input of register 21 through OR circuit 24.

Thus, the operation of this multiplier circuit is as follows when assuming arbitrarily that a cycle starts with an impulse $a_1$ : the impulses $F_2$ being used as clock impulses for synchronizer 20, an impulse $a_1$ gives an impulse $f_1$ to the output of synchronizer 20 if an impulse $F_1$ has been set in memory from impulse $a_1$ of the preceding cycle. This impulse $f_1$ adds one unity to the content of counter 1. The impulse $a_2$ causes the transfer of this content into the register 21.

The impulse $a_3$ checks the output $C_n$ of the carrying over flip-flop 25 and gives an impulse of frequency $F_4$ to the output of the AND circuit 23 if $C_n = 1$, in other words if the counter 2 has been previously overloaded. In that case, this impulse is transmitted into the counter divider 3. If the latter is not full, this impulse is simply totalized. In return, if this counter reaches its capacity, the output impulse at $F_3$ frequency, representative of the result, is also utilized to return the counter 1 to zero according to the process of the invention.

The impulse $a_4$ ensures the return to zero of the flip-flop 25 of which the output $C_n$ was mentioning a possible carrying over obtained at the end of the addition of the preceding cycle. The nine impulses $a_5$ cause nine time in succession, the progress of one step, of the registers 21 and 2 so that after the ninth impulse, the content of register 2 has increased — if it has not been overloaded in the interval of time — of the content of register 21, that is of the content of counter 1, except for the case where an output impulse has just been received at the output of the divider 3 at the preceding impulse $a_3$; in that case, the content of counter 2 has only increased of the half-content of counter 1, since a shift of one step from left to right of the register 21, under the effect of the impulse to return counter 1 to zero, corresponds to a division per two of the content of this register.

This operation becomes necessary because the process of numerical multiplication is not effectively permanent and practically the frequencies and the number of stages of recorders are limited.

The computation shows that the preceding arrangement permits to entirely correct the resulting error while considering the mean average frequency $F_3$.

The last impulse $a_5$ indicating the end of the cycle, the operation is repeated again in the same way upon the arrival of a next impulse $a_1$.

Assuming the capacities $a/2$ of the counter 1 and 2 equal to $2^9$ and the capacity R of counter 3 equal to $2^8$, the output frequency $F_3$, with the figures previously adopted is.

$$F_3 = (f_1 \cdot f_2)/aR = (f_1 \cdot f_2)/2^{18} = (F_1 \cdot F_2)/13.2^{18}$$

Without modifying the circuit operation, FIG. 4 can be realized in putting end to end the divider 3 and register 2 to constitute only one recorder. In that case, the output impulses $F_3$ are received at the output of the AND circuit 23.

FIG. 6 shows a simplified diagram for a possible realization of the synchronizer 20. A counter 31 with thirteen states, for instance a pre-selection binary counter is followed by a decoder 32, such as a diode selector, converting the 13 states of counter 31 into marking signals, distributed on the outputs $a_1, a_2, a_3, a_4$ and the nine other ones connected into $a_5$. The signal $a_1$ is applied to the memory-circuit 33.

At each series of 13 impulses $F_2$, the signals $a_1$ to $a_5$ are so elaborated, they are shown on FIG. 5 and distributed on the five output desired.

Of course, when the computation of the square root is made by numerical means as previously described, the frequency signal obtained can be converted into an analogical signal, if desired, for its further treatment or its remote transmission.

The device for the realization of the process of the invention being related to logical factors only, it can be of course realized with electronic components, fluidic components or others. Since such components are equivalent in the art, their choice is only at the will of the user.

I claim:

1. A pulse-rate method for computing the square root of the product of magnitudes which comprises the steps of:
   continuously converting each of said magnitudes into a series of pulses having a frequency proportional to the magnitude,
   continuously and separately registering each pulse series in a memory provided therefor,
   continuously multiplying together the pulse series which have been registered thereby to obtain a resultant signal of the multiplied frequency,
   dividing said multiplied frequency signal by a fixed number thereby to obtain successive data having a frequency equal to the multiplied frequency divided by said fixed number and which is proportional to the square root of the product of the magnitudes, and
   applying each of said data to reset one of said memories.

2. A pulse rate device for computing the square root of the product of magnitudes which comprises:
   a set of magnitude-to-frequency converters each receiving data corresponding to one of said magnitudes and delivering at its output a corresponding series of pulses at a frequency proportional to the magnitude,
   a set of memory registers connected respectively to the outputs of said magnitude-to-frequency converters for recording each pulse series,
   a pulse multiplier connected to the outputs of said memory registers for obtaining the product of the pulse series,
   and a pulse frequency divider operating with a fixed divisor and connected to receive the output from said pulse multiplier for producing at its output a signal having a frequency proportional to the square root of the product of said magnitudes, the output of said pulse frequency divider being applied to and effecting a reset to zero of one of said memory registers.

3. Device as set forth in claim 2, comprising further a pulse synchronizer circuit connected between the magnitude-to-frequency converters and the memory-registers.

4. Device as set forth in claim 2, wherein said memory-registers are in the form of binary counters having the same capacity.

5. Device as set forth in claim 2 wherein each of said memory registers includes a number of stages and wherein said pulse multiplier includes a number of AND circuits equal to the number of stages of said memory registers, each said AND circuit having two inputs and one output, the inputs of said AND circuits being connected respectively to complementary order stages of said memory registers, and the outputs of said AND circuits being connected respectively through differentiation circuits to inputs of an OR circuit having an output connected to a first input of a two-input AND circuit of which the second input thereto is connected to one of said magnitude-to-frequency converters through a NOT circuit.

6. Device as set forth in claim 2 wherein for computing square root of a product of two magnitudes, the set of magnitude-to-frequency converters comprises two of said converters, the set of memory-registers comprises a first and a second memory-registers and said multiplier is constituted by a third memory-register and by an adder comprising a carrying-over flip-flop and having series inputs connected to outputs of said second and third memory-registers, one output of said adder being connected to input of said second memory register, whereby content of said first memory registers is transferred into said third memory register and added to content of said second memory register upon each pulse received thereby.

7. Device as set forth in claim 6 and which further comprises a pulse synchronizer circuit connected between said magnitude-to-frequency converters and said memory registers, said pulse synchronizer circuit comprising a pulse counter having its output connected to the input of a decoder thus to provide phase-shifted control pulses.

8. Device as set forth in claim 7 wherein one of said control pulses is applied to one input of an AND circuit having a second input connected to the output from the said carrying-over flip-flop of said adder, the output of said AND circuit being connected to the input to said pulse frequency divider.

9. Device as set forth in claim 7 wherein one of said control pulses is applied to said third memory-register to transfer therein the content of the first memory-register.

10. Device as set forth in claim 7 wherein one of said control pulses is applied to reset the carrying-over flip-flop of said adder.

11. A pulse rate device for computing the square root of the product of two magnitudes which comprises,
- a pair of magnitude-to-frequency converters each receiving data corresponding to one of the two magnitudes,
- first and second memory registers connected respectively to the outputs from said magnitude-to-frequency converters through a pulse synchronizer circuit, and
- a third memory register connected to an adder through a pulse divider whereby said pulse divider and third memory register form only one register, said adder comprising a carrying-over flip-flop and having series inputs connected to the outputs of said second and third memory registers,
- one output of said pulse synchronizer being applied to one input of an AND circuit of which a second input is connected to the carrying over flip-flop of said adder, the output of said AND circuit constituting the output of said pulse rate device.

* * * * *